United States Patent
Jiang

(10) Patent No.: US 12,299,231 B2
(45) Date of Patent: May 13, 2025

(54) SCREEN TOUCH POINT POSITIONING METHOD, DEVICE, AND ELECTRONIC APPARATUS

(71) Applicant: TCL CHINA STAR OPTOELECTRONICS TECHNOLOGY CO., LTD., Shenzhen (CN)

(72) Inventor: Tingting Jiang, Shenzhen (CN)

(73) Assignee: TCL CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/638,091

(22) PCT Filed: Feb. 7, 2022

(86) PCT No.: PCT/CN2022/075349
§ 371 (c)(1),
(2) Date: Feb. 24, 2022

(87) PCT Pub. No.: WO2023/137798
PCT Pub. Date: Jul. 27, 2023

(65) Prior Publication Data
US 2024/0143106 A1    May 2, 2024

(30) Foreign Application Priority Data
Jan. 18, 2022  (CN) .......................... 202210053855.5

(51) Int. Cl.
*G06F 3/041* (2006.01)
(52) U.S. Cl.
CPC .............................. *G06F 3/04166* (2019.05)
(58) Field of Classification Search
None
See application file for complete search history.

(56) References Cited

U.S. PATENT DOCUMENTS

| | | | |
|---|---|---|---|
| 2008/0218489 A1* | 9/2008 | Park ...................... | G06F 3/0416 |
| | | | 345/173 |
| 2009/0146964 A1* | 6/2009 | Park ...................... | G06F 3/047 |
| | | | 345/173 |

(Continued)

FOREIGN PATENT DOCUMENTS

| CN | 101788865 A | 7/2010 |
|---|---|---|
| CN | 112783369 A | 5/2021 |

(Continued)

OTHER PUBLICATIONS

PCT International Search Report for International Application No. PCT/CN2022/075349, mailed on Oct. 9, 2022, 8pp.

(Continued)

*Primary Examiner* — Krishna P Neupane
(74) *Attorney, Agent, or Firm* — The Roy Gross Law Firm, LLC; Roy D. Gross

(57) ABSTRACT

The present application provides a screen touch point positioning method, a device, and an electronic apparatus. The screen touch point positioning method includes: sequentially scanning each of the point positions on a screen to obtain each of the touch feature value of the point position, determining an end point coordinate; then aggregating adjacent sensed point positions of each row to touch line segments; further determining the line segment coordinates of the touch line segments; aggregating each of the touch line segments to obtain an aggregation touch region; finally determining a coordinate of a screen touch point. The embodiment of the present application solves an issue of a conventional screen touch point positioning method being complicated and time consuming.

18 Claims, 6 Drawing Sheets

(56) References Cited

U.S. PATENT DOCUMENTS

2010/0315361 A1* 12/2010 Wang .................. G06F 3/04166
                                                                    345/173
2013/0176247 A1    7/2013 Jogo et al.

FOREIGN PATENT DOCUMENTS

| CN | 112799533 A | 5/2021 |
| CN | 113885729 A | 1/2022 |
| WO | 2019014858 A1 | 1/2019 |

OTHER PUBLICATIONS

PCT Written Opinion of the International Searching Authority for International Application No. PCT/CN2022/075349, mailed on Oct. 9, 2022, 9pp.

Chinese Office Action issued in corresponding Chinese Patent Application No. 202210053855.5 dated Apr. 27, 2023, pp. 1-7, 18pp.

* cited by examiner sequentially scanning each of the point positions of the screen row by row to obtain a touch feature value of each of the point positions

S210 determining the point positions as an end point of the touch line segment and recording the end point coordinate of the end point when the touch feature value of the point position is greater than a predetermined touch feature threshold and the touch feature value of another point position adjacent to the point position in the same column is less than the touch feature threshold

S220

FIG. 3 determining the column coordinates of the two end points of the touch line segment and a row coordinate of the row

S310 determining the line segment coordinates of the touch line segments based on the column coordinates of the two end points of the touch line segment and the row coordinate of the row

S320

FIG. 4 determining the column coordinate of the screen touch point according to the column coordinate of each of the touch line segments end point in the aggregation region

S510 determining the row coordinate of the screen touch point according to the row coordinate of each of the touch line segments in the aggregation region

S520

FIG. 7 determining the column coordinate of the screen touch point according to the column coordinate of the midpoint of each of the touch line segments in the aggregation region

S560 determining the row coordinate of the screen touch point according to the row coordinate of the midpoint of each of the touch line segments in the aggregation region

SCREEN TOUCH POINT POSITIONING METHOD, DEVICE, AND ELECTRONIC APPARATUS

CROSS REFERENCE TO RELATED APPLICATIONS

This application is a National Phase of PCT Patent Application No. PCT/CN2022/075349 having International filing date of Feb. 7, 2022, which claims the benefit of priority of Chinese Application No. 202210053855.5 filed on Jan. 18, 2022. The contents of the above applications are all incorporated by reference as if fully set forth herein in their entirety.

FIELD OF INVENTION

The present application relates to a field of display technologies, especially to a screen touch point positioning method, a device, and an electronic apparatus.

BACKGROUND OF INVENTION

At present, touch panel screens are applied very extensively in a field of display apparatus, for example projector, game console, television, and other similar apparatus. To position a screen touch point, usually a digital image process technology is to determine an actual position of a touch point by calculating a position of the touch point in an image. In actual applications, by sensors capturing all pixel points sensing touch on a screen and proceeding with complicated noise reduction and aggregation algorithms, pixel point coordinates of a touch aggregation region are obtained. Then, a coordinate of the touch point is determined according to the coordinate of each point of the touch aggregation region. The screen touch point positioning method is excessively complicated, occupies a great amount of resources, and is time consuming.

SUMMARY OF INVENTION

Technical Issue

An embodiment of the present application provides a screen touch point positioning method, device and an electronic apparatus to solve an issue that a conventional screen touch point positioning method is over complicated, occupies over resources, and is time consuming.

Technical Solution

Other characteristics and advantages of the present application are apparent through the following descriptions, or are partially studied through practice of the present application.

According to an aspect of the embodiment of the present application, a screen touch point positioning method is provided and includes: sequentially scanning a plurality of point positions on a screen row by row and determining end point coordinates of touch line segments; determining line segment coordinates of the touch line segments according to the end point coordinates of the touch line segments; aggregating each of the touch line segments to obtain an aggregation touch region; and determining a coordinate of a screen touch point according to the line segment coordinate of each of the touch line segments in the aggregation touch region.

In some embodiments of the present application, the step of sequentially scanning the point positions on the screen row by row and determining the end point coordinates of the touch line segments, specifically includes: sequentially scanning each of the point positions of the screen row by row to obtain a touch feature value of each of the point positions; and determining the point positions as an end point of the touch line segment and recording the end point coordinate of the end point when the touch feature value of the point position is greater than a predetermined touch feature threshold and the touch feature value of another point position adjacent to the point position in the same column is less than the touch feature threshold.

In some embodiments of the present application, the step of determining the line segment coordinates of the touch line segments, specifically includes: determining the column coordinates of the two end points of the touch line segment and a row coordinate of the row; and determining the line segment coordinates of the touch line segments based on the column coordinates of the two end points of the touch line segment and the row coordinate of the row.

In some embodiments of the present application, the step of determining the coordinate of the screen touch point according to the line segment coordinate of each of the touch line segments in the aggregation touch region, specifically includes: determining the column coordinate of the screen touch point according to the column coordinate of each of the touch line segments end point in the aggregation region; and determining the row coordinate of the screen touch point according to the row coordinate of each of the touch line segments in the aggregation region.

In some embodiments of the present application, the step of determining the line segment coordinates of the touch line segments, specifically includes: determining the column coordinates of the two end points of the touch line segment; determining a column coordinate of a midpoint of the touch line segment based on the column coordinates of the two end points of the touch line segment; and determining the line segment coordinate of the touch line segment based on the column coordinate and a row coordinate of the midpoint of the touch line segment.

In some embodiments of the present application, the step of determining the coordinate of the screen touch point according to the line segment coordinate of each of the touch line segments in the aggregation touch region, specifically includes: determining the column coordinate of the screen touch point according to the column coordinate of the midpoint of each of the touch line segments in the aggregation region; and determining the row coordinate of the screen touch point according to the row coordinate of the midpoint of each of the touch line segments in the aggregation region.

In some embodiments of the present application, the step of aggregating each of the touch line segments to obtain an aggregation touch region, specifically includes:

comparing the end point coordinates of the touch line segments of adjacent two rows; determining that the two touch line segments are located in the same touch when the column coordinate of the end point of one of the touch line segments is located between the column coordinates of the two end points of another of the touch line segments; and aggregating the touch line segments in the same touch region to obtain the aggregation touch region.

According to another aspect of the embodiment of the present application, a screen touch point positioning device is provided and includes: a scan module configured to sequentially scan a plurality of point positions on a screen row by row and determine end point coordinates of touch line segments; a determination module configured to determine line segment coordinates of the touch line segments according to the end point coordinates of the touch line segments; an aggregation module configured to aggregate each of the touch line segments to obtain an aggregation touch region; and a positioning module configured to determine a coordinate of a screen touch point according to the line segment coordinate of each of the touch line segments in the aggregation touch region.

In some embodiments of the present application, the scan module specifically includes: collection sub-module configured to sequentially scan each of the point positions of the screen row by row to obtain a touch feature value of each of the point positions; record sub-module and configured to determine the point positions as an end point of the touch line segment and record the end point coordinate of the end point when the touch feature value of the point position is greater than a predetermined touch feature threshold and the touch feature value of another point position adjacent to the point position in the same column is less than the touch feature threshold.

In some embodiments of the present application, the determination module specifically includes: first coordinate determination sub-module configured to determine the column coordinates of the two end points of the touch line segment and a row coordinate of the row; first line segment coordinate sub-module configured to determine the line segment coordinates of the touch line segments based on the column coordinates of the two end points of the touch line segment and the row coordinate of the row.

In some embodiments of the present application, the positioning module specifically includes: a first column coordinate sub-module configured to determine the column coordinate of the screen touch point according to the column coordinate of each of the touch line segments end point in the aggregation region; and a first row coordinate sub-module configured to determine the row coordinate of the screen touch point according to the row coordinate of each of the touch line segments in the aggregation region.

In some embodiments of the present application, the determination module specifically includes: a second coordinate determination sub-module configured to determine the column coordinates of the two end points of the touch line segment; a third coordinate determination sub-module configured to determine a column coordinate of a midpoint of the touch line segment based on the column coordinates of the two end points of the touch line segment; and a second line segment coordinates sub-module configured to determine the line segment coordinate of the touch line segment based on the column coordinate and a row coordinate of the midpoint of the touch line segment.

In some embodiments of the present application, the positioning module specifically includes: a second column coordinate sub-module configured to determine the column coordinate of the screen touch point according to the column coordinate of the midpoint of each of the touch line segments in the aggregation region; and a second row coordinate sub-module configured to determine the row coordinate of the screen touch point according to the row coordinate of the midpoint of each of the touch line segments in the aggregation region.

In some embodiments of the present application, the aggregation module specifically includes: a comparison sub-module configured to compare the end point coordinates of the touch line segments of adjacent two rows; a determination sub-module configured to determine that the two touch line segments are located in the same touch when the column coordinate of the end point of one of the touch line segments is located between the column coordinates of the two end points of another of the touch line segments; and an aggregation sub-module configured to aggregate the touch line segments in the same touch region to obtain the aggregation touch region.

According to another aspect of the embodiment of the present application, a electronic apparatus is provided and includes: at least one processor; and a storage device configured to store at least one program, wherein when the at least one program is implemented by the at least one processor, the at least one processor implements step as follows:

sequentially scanning a plurality of point positions on a screen row by row and determining end point coordinates of touch line segments;

determining line segment coordinates of the touch line segments according to the end point coordinates of the touch line segments;

aggregating each of the touch line segments to obtain an aggregation touch region; and determining a coordinate of a screen touch point according to the line segment coordinate of each of the touch line segments in the aggregation touch region.

In some embodiments of the present application, the step of sequentially scanning the point positions on the screen row by row and determining the end point coordinates of the touch line segments step, the processor implements steps as follows:

sequentially scanning each of the point positions of the screen row by row to obtain a touch feature value of each of the point positions; and determining the point positions as an end point of the touch line segment and recording the end point coordinate of the end point when the touch feature value of the point position is greater than a predetermined touch feature threshold and the touch feature value of another point position adjacent to the point position in the same column is less than the touch feature threshold.

In some embodiments of the present application, the step of determining the line segment coordinates of the touch line segments, the processor implements steps as follows:

determining the column coordinates of the two end points of the touch line segment and a row coordinate of the row; and determining the line segment coordinates of the touch line segments based on the column coordinates of the two end points of the touch line segment and the row coordinate of the row.

In some embodiments of the present application, the step of determining a coordinate of a screen touch point according to the line segment coordinate of each of the touch line segments in the aggregation touch region step, the processor implements steps as follows:

determining the column coordinate of the screen touch point according to the column coordinate of each of the touch line segments end point in the aggregation region; and determining the row coordinate of the screen touch point according to the row coordinate of each of the touch line segments in the aggregation region.

In some embodiments of the present application, the step of determining the line segment coordinates of the touch line segments, the processor implements steps as follows:

determining the column coordinates of the two end points of the touch line segment; and determining a column coordinate of a midpoint of the touch line segment based on the column coordinates of the two end points of the touch line segment; and determining the line segment coordinate of the touch line segment based on the column coordinate and a row coordinate of the midpoint of the touch line segment.

In some embodiments of the present application, the step of determining a coordinate of a screen touch point according to the line segment coordinate of each of the touch line segments in the aggregation touch region step, the processor implements steps as follows:

determining the column coordinate of the screen touch point according to the column coordinate of the midpoint of each of the touch line segments in the aggregation region; and determining the row coordinate of the screen touch point according to the row coordinate of the midpoint of each of the touch line segments in the aggregation region.

According to another aspect of the embodiment of the present application, a computer program product or computer program is provided, and the computer program product or computer program includes computer instruction, the computer instruction is stored in a computer readable storage medium. A processor of the computer apparatus reads the computer instruction from the computer readable storage medium, and the processor implements the computer instruction such that the computer apparatus implements the screen touch point positioning methods provided by the above various optional embodiments.

Advantages

In technical solutions provided by some embodiments of the present application, by sequentially scanning, aggregates adjacent point positions of a touch message sensed on the screen into a touch line segment, aggregates touch line segments in the same touch region, and calculates to obtain a coordinate of a screen touch point according to line segment coordinates of the touch line segments in the aggregation touch region. The technical solution of the present application can complete aggregation of the touch region during sequentially scanning, and simultaneously, positioning the touch point only requires the line segment coordinate of the touch line segment without coordinates of all points of the line segment, which not only reduces a stored data amount but also reduces occupation of resources. Also, calculation is reduced, steps are simplified, which reduces occupation of calculation resources and reduces calculation time to solve an issue that a conventional screen touch point positioning method is over complicated, occupies over resources, and is time consuming.

It should be understood that the above general descriptions and later descriptions are only exemplary and explanatory and cannot limit the present application.

DESCRIPTION OF DRAWINGS

Accompanying drawings, incorporated into the specification as parts of the specification, illustrate embodiments complying with the present application, and are used with the specification to construe principles of the present application. Apparently, the following accompanying drawings of the descriptions are only some embodiments of the present application, for a person of ordinary skill in the art, can also be used for obtaining other accompanying drawings under a prerequisite without creative efforts. In the accompanying drawings:

FIG. 3 is a specific embodiment flowchart of a step S200 of a screen touch point positioning method presented by the corresponding embodiment according to FIG. 2.

FIG. 4 is a specific embodiment flowchart of a step S300 of a screen touch point positioning method presented by the corresponding embodiment according to FIG. 2.

FIG. 7 is a specific embodiment flowchart of a step S500 of a screen touch point positioning method presented by the corresponding embodiment according to FIG. 4.

FIG. 8 is a specific embodiment flowchart of a step S500 of the screen touch point positioning method presented by the corresponding embodiment according to FIG. 5.

DETAILED DESCRIPTION OF PREFERRED EMBODIMENTS

Descriptive paragraphs of the present invention follows.

Now accompanying drawings are referred to more comprehensively describe exemplary embodiments. However, the exemplary embodiment can be embodied in various ways and should not be understood as a limit by the examples described here. On the contrary, providing these embodiments makes the present application more comprehensive and complete and concepts of the exemplary embodiments are transmitted comprehensively to a person of ordinary skill in the art.

Furthermore, described feature, structure or characteristic can be combined in one or more embodiments in any suitable ways. In the following descriptions, many specific details are provided to allow sufficient understanding to the embodiments of the present application. However, a person of ordinary skill in the art would be aware that technical solutions of the present application can be practiced without one or more of the specific details, or method, element, device, step, etc. can be adopted. In other conditions, known method, device, embodiment or operation are not shown or described in details to prevent to avoid obscuring aspects of the present application.

Block diagrams shown in the accompanying drawings are only functional entities and do not necessarily correspond to a physically individual entities. In other words, these functional entities can be embodied in form of software, or these functional entities can be embodied in one or more hardware module or integrated circuit, or these functional entities are embodied in different internets and/or processor devices and/or micro control devices.

Flowcharts shown in the accompanying drawings are only for exemplary explanation, do not necessarily include all contents and operations/steps, and are not implemented necessarily in described orders. For example, some operations/steps can also be divided, and some operations/steps can be combined or partially combined. Therefore, an actual implementation order probably varies according to actual conditions.

Figure 1:
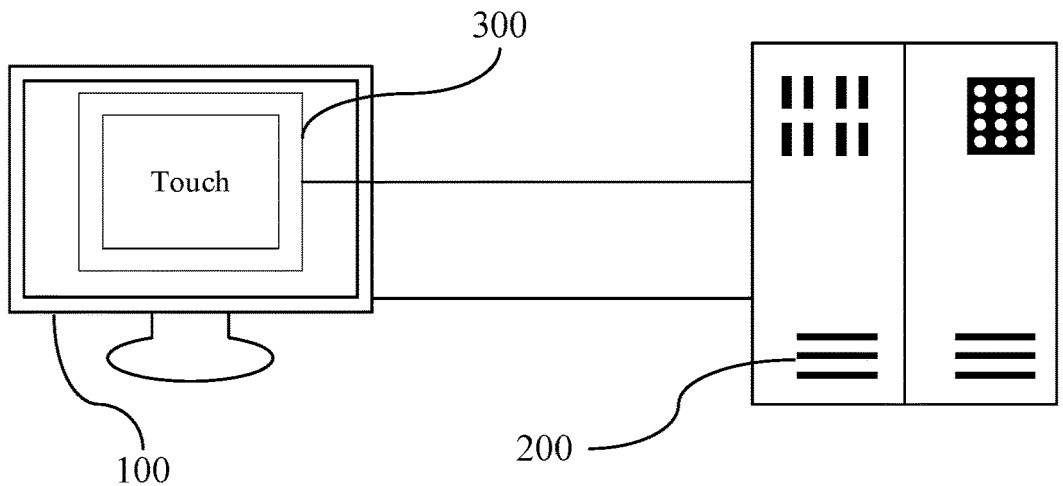
FIG. 1 illustrates a schematic view of an exemplary system framework of a technical solution can be applied to the embodiment of the present application.

FIG. 1 is an embodiment environmental view of a screen touch point positioning method provided by an embodiment. With reference to FIG. 1, the embodiment environment includes a large screen display apparatus including a control module 100, a display module 200 and a touch module 300.

The display module 200 is a module that can be installed in any touch display apparatus requiring a display interface and provide the apparatus with the display interface. The display module 200 can be installed in various of touch display apparatuses. The touch module 300 is installed on the display module 200, is a module configured to collect a touch message of on each of the point positions the display module 200. The control module 100 is a module used to control the display apparatus, can control the display module 200 to display, and can also collect and process the touch message of each of the point positions on the display module 200 through the touch module 300.

During use, the control module 100 through the touch module 300 collects a touch message of each of the point positions of the display module 200, implements noise reduction and aggregation processes, and finally identifies and positions touch identification points.

It should be explained that the control module 100 and the display module 200, the touch module 300 can be connected by wired or wireless way or other communication way, and the present invention has no limit thereto.

Figure 2:
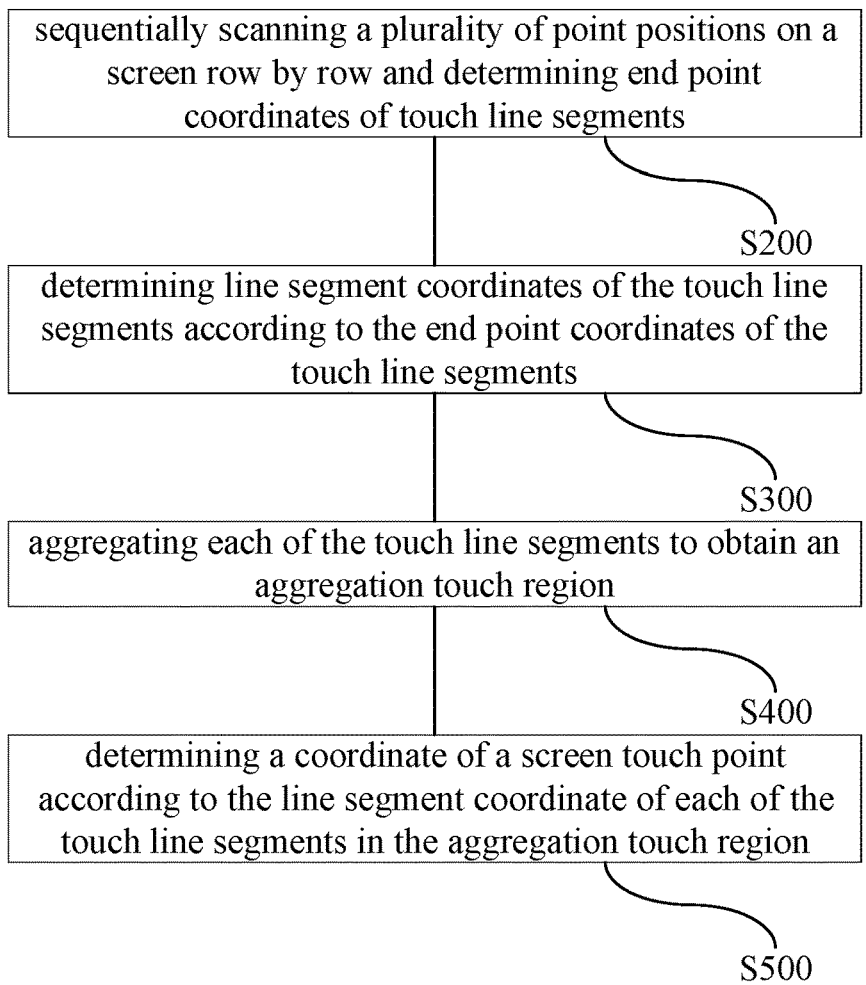
FIG. 2 exemplarily illustrates according to a flowchart of a screen touch point positioning method of an embodiment of the present application.

Details for achieving technical solutions of the embodiment of the present application are described specifically as follows:

FIG. 2 illustrates a flowchart of a screen touch point positioning method according to an embodiment of the present application. The screen touch point positioning method can be implemented by the control module 100, and the control module 100 can be the control module 100 as shown in FIG. 1. With reference to FIG. 2, the screen touch point positioning method at least includes a step S200 to a step S500 that are introduced in detail as follows:

A step S200 includes sequentially scanning a plurality of point positions on a screen row by row and determining end point coordinates of touch line segments.

A step S300 includes determining line segment coordinates of the touch line segments according to the end point coordinates of the touch line segments.

A step S400 includes aggregating each of the touch line segments to obtain an aggregation touch region.

A step S500 includes determining a coordinate of a screen touch point according to the line segment coordinate of each of the touch line segments in the aggregation touch region.

In the present embodiment, first the touch message of each of the point positions on the display module 200 is sequentially collected by the touch module 300, and touch point positions is filtered initially, simultaneously end points of the touch line segments are determined according to a touch message. After the end points of two ends of the touch line segment, a range of the touch line segments constituted by sensing points sensing the touch message is acquired. Furthermore, the line segment coordinates of the touch line segments are determined according to end point coordinate. Then, adjacent ones of the touch line segments are aggregated further according to the line segment coordinates of the touch line segments or the end point coordinates thereof to obtain a touch aggregation region. Finally, a position of the screen touch point can be determined according to each of the line segment coordinates of the touch line segments in the touch region. In the meantime, the determined touch identification point is deemed finally as a point where a user performs a touch operation, and the display apparatus performs later operation after the touch based on response of the above touch identification point.

An obtaining method of the above touch point can be uses different touch modules 300 for collection according to different touch types. For example, when the touch type is a light source touch, the touch module 300 can be a light point touch module. When touch type is a press touch, the touch module 300 can be a pressure touch module. When touch type is a contact touch, the touch module 300 can be a current touch module or a voltage touch module. When touch type is a magnetically sensitive touch, the touch module 300 can be a magnetically sensitive module.

In the step S200, whether each of the point positions senses a touch message is determined by a touch feature value. A way of determining the end point coordinate is determining the point position as an end point when one point position senses a touch message and adjacent point positions does not sense the touch message. After determining the end point, all sensing point positions sensing the touch message can be aggregated according to the end point to determine a range and a position of the touch line segment constituted commonly. The touch line segment is a connection line including two end points.

In particular, in some embodiments, a specific embodiment of the step S200 can refer to FIG. 3. FIG. 3 is a specific description of a step S200 of a screen touch point positioning method presented by the corresponding embodiment according to FIG. 2, in the screen touch point positioning method, the step S200 can include steps as follows:

A step S210 includes sequentially scanning each of the point positions of the screen row by row to obtain a touch feature value of each of the point positions.

A step S220 includes determining the point positions as an end point of the touch line segment and recording the end point coordinate of the end point when the touch feature value of the point position is greater than a predetermined touch feature threshold and the touch feature value of another point position adjacent to the point position in the same column is less than the touch feature threshold.

In the present embodiment, each of the touch feature value of the point position is sequentially scanned and obtained. When the touch feature value of the point position is greater than a predetermined touch feature threshold, it is a sensing point sensing the touch message. When the touch feature value of the point position is less than a predetermined touch feature threshold, it is a non-sensing point senses no touch message. When points adjacent to one sensing point in the same row are non-sensing point, it is one of the two end points of the touch line segment, and an end point coordinate of the end point is recorded. In the present embodiment, a specific way of determining whether the point position is an end point is determining the point positions as an end point when the touch feature value of the point position is greater than the predetermined touch feature threshold and touch feature values of adjacent point positions in the same row are less than touch feature threshold.

Also, in some embodiments, also it can be determined whether the end point is a start end or an ending end point of the touch line segments. The connection line between the start end and the adjacent ending end point is the touch line segment.

In some embodiments, a determination basis for the start end and the ending end point is it is a start end when the point position is a sensing point and a previous point position is non-sensing point. It is an ending end point when the point position is a sensing point and a next point position is a non-sensing point. In the present embodiment, a specific way of determining whether the end point is a start end or ending end point of the touch line segment is that determining it as a start end when the touch feature value of the point position is greater than a predetermined touch feature threshold, and a touch feature value of a previous point position is less than touch feature threshold; and determining it as an ending end point when the touch feature value of the point position is greater than a predetermined touch feature threshold and a touch feature value of a next point position is less than touch feature threshold.

In another some embodiments, a determination basis for the start end and the ending end point is that when the point position is an odd sensing point of the present row, it is a start end. When the point position is an even sensing point of the present row, it is an ending end point. A specific determination way is that the sensing points of each row are numbered sequentially, the sensing points of odd numbers are start ends, and the sensing points of even numbers are ending end points.

For determining the range of the touch line segment, a specific way can be: when the way of determining the start end and the ending end point is performing determination by the sensing point and the non-sensing point, a connection line from a start end to a nearest ending end point along a scanning direction of the touch module 300 is the touch line segment. When the way of determining the start end and the ending end point is performing determination by numbers, a connection line from a start end to a nearest ending end point along a numbering direction is the touch line segment.

In the step S300, expression ways of the line segment coordinate of the touch line segment can be various, for example, a way using two end points as a line segment coordinate, for example, a way using a coordinate of a line segment midpoint as a line segment coordinate. Different expression ways of line segment coordinates have different determination ways.

In particular, in some embodiments, a specific embodiment of the step S300 can refer to FIG. 4. FIG. 4 is a specific description of a step S300 of a screen touch point positioning method presented by the corresponding embodiment according to FIG. 2, the screen touch point positioning method, step S300 can include steps as follows:

A step S310 includes determining the column coordinates of the two end points of the touch line segment and a row coordinate of the row.

A step S320 includes determining the line segment coordinates of the touch line segments based on the column coordinates of the two end points of the touch line segment and the row coordinate of the row.

In the present embodiment, an expression way of the line segment coordinate of the touch line segment uses two end points as a line segment coordinate, and the specific expression thereof is $(x_1, x_2, y)$.

$x_1$ is a head column coordinate, and is a column coordinate of a start end of the touch line segments. $x_2$ is a tail column coordinate, is a column coordinate of an ending end point of the touch line segments. Y is the row coordinate, and is a row coordinate of a row where the touch line segment is located, and is also a row coordinate of the start end and the ending end point.

A record expression way of the present embodiment, compared to the coordinate directly using two end points, has less characters and occupies less storage resources. Therefore, in the present embodiment, first, in the step S310, the column coordinate of the two end points of the touch line segment and the row coordinate of the row where it is located are determined, namely, the $x_1$, $x_2$ and y are determined. Then, in the step S320, the line segment coordinate of the touch line segment is recorded and expressed in form of $(x_1, x_2, y)$.

Figure 5:
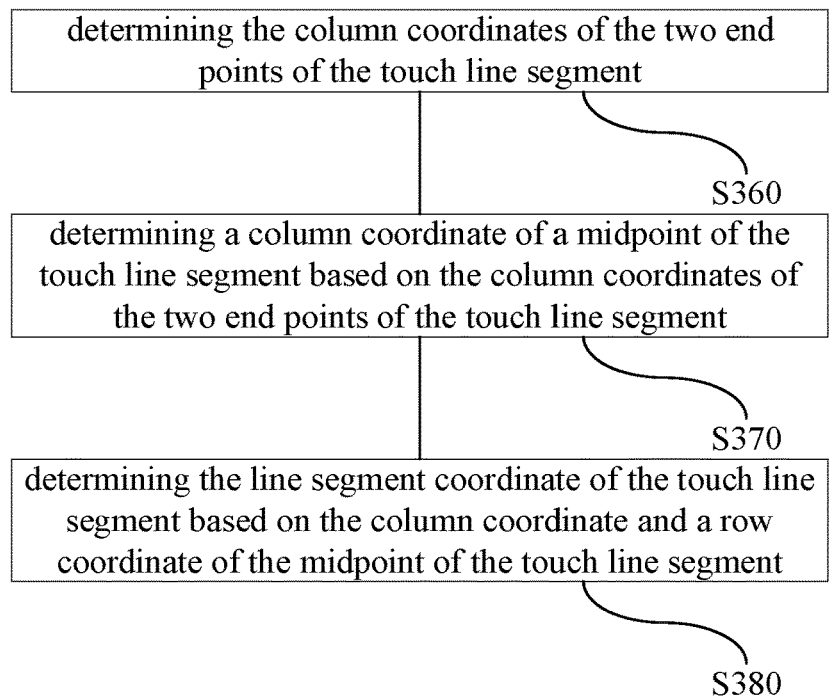
FIG. 5 is a specific embodiment flowchart of a step S300 of another screen touch point positioning method presented by the corresponding embodiment according to FIG. 2.

In particular, in some embodiments, a specific embodiment of the step S300 can refer to FIG. 5. FIG. 5 is a specific description of a step S300 of another screen touch point positioning method presented by the corresponding embodiment according to FIG. 2. In the screen touch point positioning method, the step S300 can include steps as follows:

A step S360 includes determining the column coordinates of the two end points of the touch line segment.

A step S370 includes determining a column coordinate of a midpoint of the touch line segment based on the column coordinates of the two end points of the touch line segment.

A step S380 includes determining the line segment coordinate of the touch line segment based on the column coordinate and a row coordinate of the midpoint of the touch line segment.

In the present embodiment, an expression way of the line segment coordinate of the touch line segment is using a midpoint coordinate of the touch line segment as a line segment coordinate, and a specific expression way thereof can be (x, y), and can be (x, y, z).

The midpoint column coordinate is a column coordinate of the midpoint of the touch line segment, and is obtained by calculating an average of the column coordinates of the two end points of the touch line segment. The midpoint row coordinate is a row coordinate of the midpoint of the touch line segment, i.e., the row coordinate of the row where the touch line segment is located. A length of the touch line segments is obtained by calculating a distance between two end points of the touch line segment, i.e., a difference between the tail column coordinate and the head column coordinate of the touch line segment.

The record expression way of the present embodiment has a smaller number of characters and occupies less storage resources.

Therefore, in some embodiments, first, the column coordinate of the two end points of the touch line segment is determined, and then an average of column coordinates of two end points is calculated to obtain a midpoint column coordinate. The midpoint row coordinate of the touch line segment is its row coordinate such that x and y can be determined. In the meantime, the line segment coordinates of the touch line segments can be recorded and expressed directly in form of form of (x, y).

In another some embodiments, on the basis of the above embodiment, an absolute value of a difference between the column coordinates of the two end points is calculated to obtain a length of the touch line segment. In the meantime, the line segment coordinates of the touch line segments can be recorded and expressed in form of (x, y, z).

In the step S400, the touch line segments are aggregated. Aggregation refers to aggregating the touch line segments in the same aggregation touch region, and a determination standard is whether two touch line segments are connected, namely, whether an overlap portion exists between the touch line segments located between adjacent two rows along a scanning direction. Solutions for aggregation of touch line segments are various, aggregation can be performed according to end point coordinates of two end points of touch line segment. Also, aggregation can be performed according to line segment coordinates of the touch line segments. The above solutions will be described in combination with the following embodiments.

Figure 6:
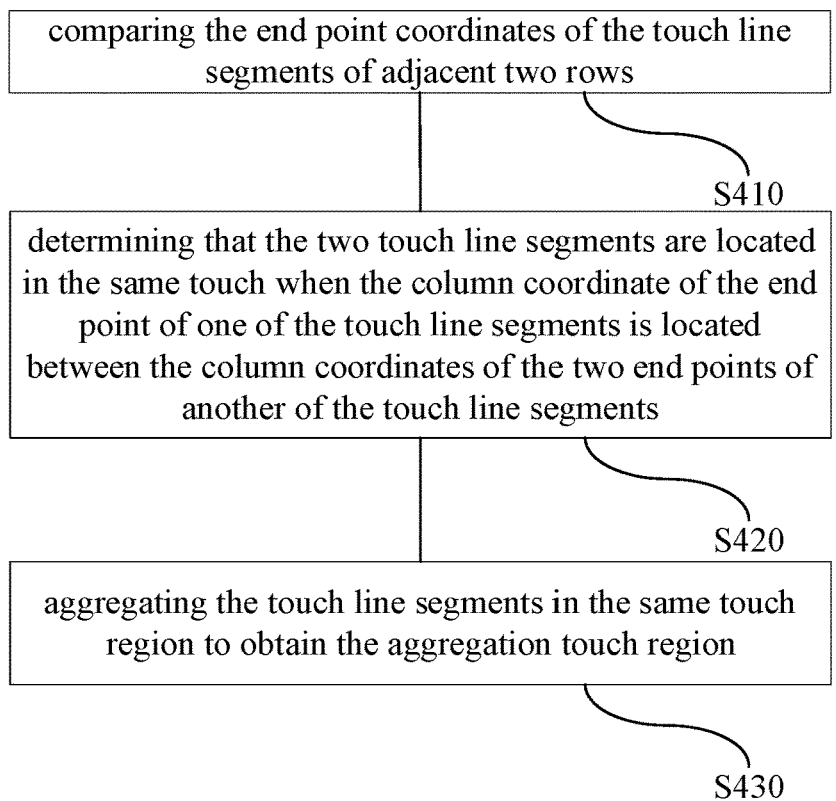
FIG. 6 is a specific embodiment flowchart of a step S400 of the screen touch point positioning method presented by the corresponding embodiment according to FIG. 2.

In the disclosed some embodiments, aggregating touch line segments is based on end points of two ends of the touch line segment. In particular, in some embodiments, a specific embodiment of a step S400 can refer to FIG. 6. FIG. 6 is a specific description of the step S400 of the screen touch point positioning method presented by the corresponding embodiment according to FIG. 2. In the screen touch point positioning method, the step S400 can include steps as follows:

A step S410 includes comparing the end point coordinates of the touch line segments of adjacent two rows.

A step S420 includes determining that the two touch line segments are located in the same touch when the column coordinate of the end point of one of the touch line segments is located between the column coordinates of the two end points of another of the touch line segments.

A step S430 includes aggregating the touch line segments in the same touch region to obtain the aggregation touch region.

In the present embodiment, an employed solution is aggregating according to end points of two ends of the touch line segment. A specific step is comparing coordinates of two end points of touch line segments in adjacent two rows. An overlap portion exists when the column coordinate of the end point of one of the touch line segments is located between the column coordinates of the two end points of another of the touch line segments, the two line segments are connected, the two touch line segments are located in the same touch region. Finally, after scanning is completed, all of the touch line segments in the same touch region are aggregated to obtain the aggregation touch region.

In some embodiments of the present application, a specific determination way in the step S420 can be, for column coordinates of end points of two adjacent touch line segments, the first touch line segment and the second touch line segment, the first touch line segment and the second touch line segment are located in the same touch region when any one end point positions of the first touch line segment is located between two end points of the second touch line segment along column coordinate axis direction; when, two end points of the second touch line segment are located between two end points of the first touch line segment along a column coordinate axis direction, first touch line segment and the second touch line segment are located in the same touch region; when the above condition is not fulfilled, the first touch line segment and the second touch line segment are in different touch regions.

In another embodiments of the present application, the specific determination way in the step S420 can also perform determination according to the following formula:

$$\delta = |z_1 + z_2 - z_3 - z_4|$$

$$\Delta = |z_4 - z_3| + |z_2 - z_1|$$

when $\delta \leq \Delta$, the first touch line segment and the second touch line segment are located in the same touch region; when $\delta > \Delta$, the first touch line segment and the second touch line segments are located in different touch regions.

$\delta$ is a first comparison parameter, $\Delta$ is a second comparison parameter, $z_1$ and $z_2$ are coordinates of two end points of the first touch line segment, $z_3$ and $z_4$ are coordinates of two end points of the second touch line segment, $\|$ is a symbol of the absolute value, $|z_1 + z_2 - z_3 - z_4|$ is an absolute value of $z_1 + z_2 - z_3 - z_4$, $|z_4 - z_3|$ is an absolute value of $z_4 - z_3$, and $|z_2 - z_1|$ is an absolute value of $z_2 - z_1$.

In some disclosed embodiments, the basis for aggregating the touch line segments is line segment coordinates of the touch line segments, when two end points are as for line segment coordinates, can refer to the embodiment of FIG. 6.

When a midpoint of the touch line segment and a length of the touch line segment are used as line segment coordinates, the following embodiment can be referred to. In particular, in some embodiments, a specific embodiment of the step S400 can refer to the following embodiment. The following embodiment is according to a specific description of the step S400 of a screen touch point positioning method presented by the corresponding embodiment in FIG. 2. In the screen touch point positioning method, step S400 can include steps as follows: calculating a midpoint column distance of the two touch line segments according to a midpoint column coordinate of the touch line segments of adjacent two rows; calculating an average length of the two touch line segments according to a line segment length of the touch line segments of adjacent two rows; when the midpoint column distance is less than the average length, the two touch line segments are located in the same touch region, the two touch line segments are located in different touch regions when the midpoint column distance is greater than the average length; and aggregating the touch line segments in the same touch region to obtain the aggregation touch region.

In the step S500, the way for determining the coordinate of the screen touch point can be determining according to line segments of all of the touch line segments in the aggregation touch region, and can be determining according to other basis.

The specific way of according to the line segment of all of the touch line segments in the aggregation touch region determining the coordinate of the screen touch point can be:

When an expression way of the line segment coordinate of the touch line segment is $(x_1, x_2, y)$, in particular, in some embodiments, a specific embodiment of the step S500 can refer to FIG. 7. FIG. 7 is a specific description of a step S500 of a screen touch point positioning method presented by the corresponding embodiment according to FIG. 4. In the screen touch point positioning method, the step S500 can include steps as follows:

A step S510 includes determining the column coordinate of the screen touch point according to the column coordinate of each of the touch line segments end point in the aggregation region.

A step S520 includes determining the row coordinate of the screen touch point according to the row coordinate of each of the touch line segments in the aggregation region.

A nature of the present embodiment is determining a row coordinate of the screen touch point according to all of the end point coordinates of touch line segments in the aggregation touch region. namely, the row coordinate of the screen touch point is determined by outline coordinates of the aggregation touch region. The specific operation method is summing and averaging column coordinates of end points of the touch line segments in the aggregation region and serving an average as a column coordinate of the screen touch point. Similarly, the specific operation method is summing and averaging row coordinates of each of the touch line segments in the aggregation region and serving an average as a row coordinate of the screen touch point to obtain a coordinate of the screen touch point.

When an expression way of the line segment coordinate of the touch line segment is (x, y) or (x, y, z), in particular, in some embodiments, a specific embodiment of the step S500 can refer to FIG. 8. FIG. 8 is a specific description of a step S500 of the screen touch point positioning method presented by the corresponding embodiment according to FIG. 5. In the screen touch point positioning method, the step S500 can include steps as follows:

A step S560 includes determining the column coordinate of the screen touch point according to the column coordinate of the midpoint of each of the touch line segments in the aggregation region.

A step S570 includes determining the row coordinate of the screen touch point according to the row coordinate of the midpoint of each of the touch line segments in the aggregation region.

A nature of the present embodiment is determining a row coordinate of a screen touch point according to a midpoint coordinate of all of the touch line segments in the aggregation touch region. The specific operation method is summing and averaging the column coordinates of each of the touch line segments midpoint in the aggregation region and serving an average as a column coordinate of the screen touch point. Similarly, the specific operation method is summing and averaging the row coordinates of each of the touch line segments in the aggregation region and serving an average as a row coordinate of the screen touch point to obtain a coordinate of the screen touch point.

In some embodiments of the present application, other way can also be employed to determine the coordinate of the screen touch point. The specific implementation way is that during aggregation of the step S400, when a certain touch line segment is not connected to any touch line segment in a previous row, it is a top portion line segment in the aggregation touch region where it is located, the row coordinate is recorded as a first row coordinate; when a certain touch line segment is not connected any touch line segment of a next row, it is a bottom portion line segment in the aggregation touch region where it is located, the row coordinate is recorded as a second row coordinate. The first row coordinate and the second row coordinate are summed to obtain an average. Namely, a row coordinate of the screen touch point is obtained. Also, during aggregation of the step S400, when the aggregation method of first embodiment is used, the maximum column coordinate and the minimum column coordinate can be recorded simultaneously as the first column coordinate and the second column coordinate while the end point coordinates of the touch line segments of adjacent two rows are compared, and during later aggregation, the maximum column coordinate and minimum column coordinate are compared to the two column coordinates of the two end points of the touch line segment. When a column coordinate of a certain end point is greater than first column coordinate, the first column coordinate is renewed as a column coordinate of the point. Similarly, when a column coordinate of a certain end point is less than second column coordinate, the second column coordinate is renewed as a column coordinate of the point.

In technical solution provided by some embodiments of the present application, aggregates adjacent point positions of the touch message sensed on the screen touch line segments by sequentially scanning, then aggregates touch line segments in the same touch region, and calculates a coordinate of the screen touch point according to the line segment coordinates of the touch line segments in the aggregation touch region. The technical solution of the present application can complete aggregation of the touch region during sequentially scanning. Simultaneously, positioning a touch point only needs the line segment coordinates of the touch line segments without coordinates of all points on the line segments, which reduces stored data amount and lower occupation of storage resources. Also, calculation is reduced to simplify steps, reduce occupation of the resources, and shorten a calculation time, which solves an issue that a conventional screen touch point positioning method is over complicated, occupies over resources, and is time consuming.

Figure 9:
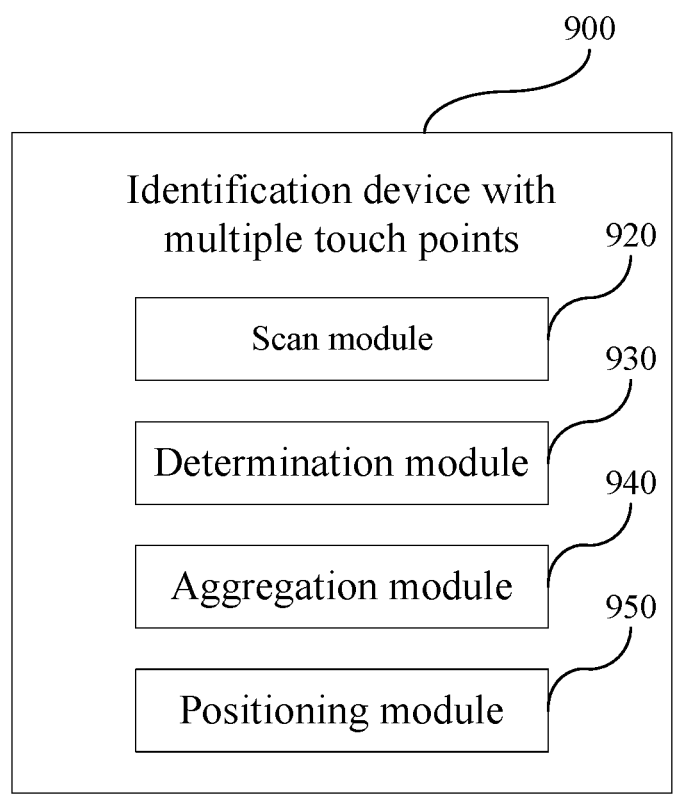
FIG. 9 illustratively illustrates a block diagram of a screen touch point positioning device of an embodiment according to the present application.

FIG. 9 illustratively illustrates a block diagram of a screen touch point positioning device of an embodiment according to the present application.

With reference to FIG. 9, a screen touch point positioning device 900 of an embodiment according to the present application includes: a scan module 920 configured to sequentially scan a plurality of point positions on a screen row by row and determine end point coordinates of touch line segments; a determination module 930 configured to determine line segment coordinates of the touch line segments according to the end point coordinates of the touch line segments; an aggregation module 940 configured to aggregate each of the touch line segments to obtain an aggregation touch region; and a positioning module 950 configured to determine a coordinate of a screen touch point according to the line segment coordinate of each of the touch line segments in the aggregation touch region.

In some embodiments of the present application, the scan module specifically includes: a collection sub-module configured to sequentially scan each of the point positions of the screen row by row to obtain a touch feature value of each of the point positions; a record sub-module and configured to determine the point positions as an end point of the touch line segment and record the end point coordinate of the end point when the touch feature value of the point position is greater than a predetermined touch feature threshold and the touch feature value of another point position adjacent to the point position in the same column is less than the touch feature threshold.

In some embodiments of the present application, the determination module specifically includes: a first coordinate determination sub-module configured to determine the column coordinates of the two end points of the touch line segment and a row coordinate of the row; and a first line segment coordinate sub-module configured to determine the line segment coordinates of the touch line segments based on the column coordinates of the two end points of the touch line segment and the row coordinate of the row.

In some embodiments of the present application, the positioning module specifically includes: a first column coordinate sub-module configured to determine the column coordinate of the screen touch point according to the column coordinate of each of the touch line segments end point in the aggregation region; and a first row coordinate sub-module configured to determine the row coordinate of the screen touch point according to the row coordinate of each of the touch line segments in the aggregation region.

In some embodiments of the present application, the determination module specifically includes: a second coordinate determination sub-module configured to determine the column coordinates of the two end points of the touch line segment; a third coordinate determination sub-module configured to determine a column coordinate of a midpoint of the touch line segment based on the column coordinates of the two end points of the touch line segment; and a second line segment coordinates sub-module configured to determine the line segment coordinate of the touch line segment based on the column coordinate and a row coordinate of the midpoint of the touch line segment.

In some embodiments of the present application, the positioning module specifically includes: a second column coordinate sub-module configured to determine the column coordinate of the screen touch point according to the column coordinate of the midpoint of each of the touch line segments in the aggregation region; and a second row coordinate sub-module configured to determine the row coordinate of the screen touch point according to the row coordinate of the midpoint of each of the touch line segments in the aggregation region.

In some embodiments of the present application, the aggregation module specifically includes: a comparison sub-module configured to compare the end point coordinates of the touch line segments of adjacent two rows; a determination sub-module configured to determine that the two touch line segments are located in the same touch when the column coordinate of the end point of one of the touch line segments is located between the column coordinates of the two end points of another of the touch line segments; and an aggregation sub-module configured to aggregate the touch line segments in the same touch region to obtain the aggregation touch region.

Figure 10:
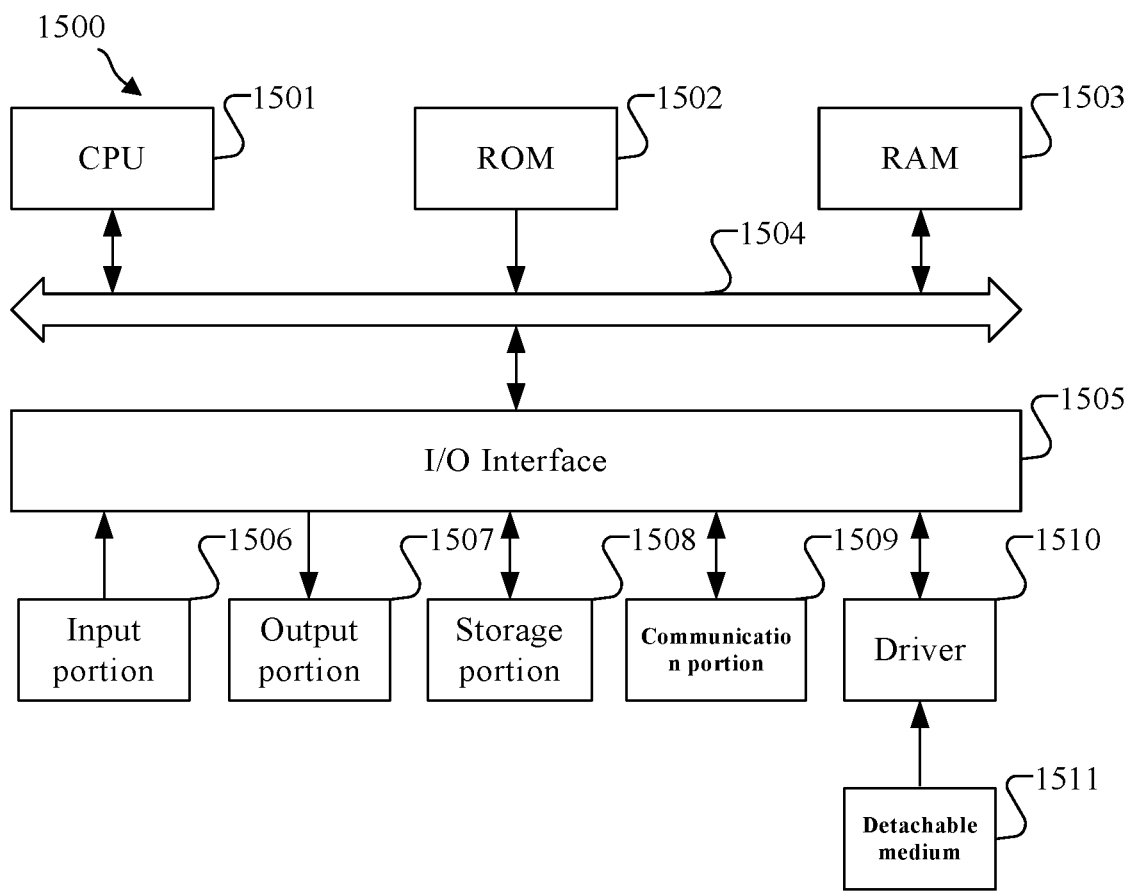
FIG. 10 illustrates a schematic structural view adapted for achieving a computer system of an electronic apparatus of the embodiment of the present application.

FIG. 10 illustrates a schematic structural view adapted for achieving a computer system of an electronic apparatus of the embodiment of the present application.

It should be explained that a computer system 1500 of the electronic apparatus shown in FIG. 10 is only one example and should not has a limit to ranges of functions and uses of the embodiment of the present application.

With reference to FIG. 10, the computer system 1500 includes central process unit (CPU) 1501, and it can implement various suitable actions and processes according to programs stored in a read-only memory (ROM) 1502 or programs loaded from a storage portion 1508 to a random access memory (RAM) 1503, for example, it can implement the method of the above embodiment. In the RAM 1503, various programs and data required by the system operation are also stored. The CPU 1501, the ROM 1502, and the RAM 1503 are connected to one another through a bus 1504. An input/output (I/O) interface 1505 is also connected to the bus 1504.

The following parts are connected to the I/O interface 1505: an input portion 1506 including a keyboard and a mouse; an output portion 1507 including a cathode ray tube (CRT), a liquid crystal display (LCD), and a speaker; a storage portion 1508 including hard disk; and a communication portion 1509 including a network interface card such as a local area network (LAN) card, a modem, etc. The communication portion 1509 performs communication processes through a network such as an intranet. A driver 1510 is also connected to the I/O interface 1505 according to demands. A detachable medium 1511 such as magnetic disk, CD-ROM, magnetic CD-ROM, semiconductor memory, etc. is installed on the driver 1510 according to demands such that computer programs read out therefrom can be conveniently installed in the storage portion 1508 according to demands.

In particular, according to the embodiments of the present application, the above descriptions with reference to the flowcharts can be realized as a computer software program. For example, the embodiment of the present application includes a computer program product, and it includes a computer program carried by the computer readable medium. The computer program includes a computer program configured to implement the method shown by the flowcharts. In such embodiment, the computer program can be downloaded from network through the communication portion 1509 and be installed, and/or be installed from a detachable medium 1511. When the computer program is implemented by the central process unit (CPU) 1501, various functions limited in the system of the present application are implemented.

It should be explained that the computer readable medium as shown in the embodiment of the present application can be a computer readable signal medium, a computer readable storage medium or any combination of the above two. The computer readable storage medium is not limited to electronic, magnetic, optical, various electromagnetic, infrared, or semiconductor system, device or element, or any combination of the above. a more specific example of the computer readable storage medium can include but is not limited to: electrical connection of one or more wires, portable computer magnetic disk, hard disk, random access memory (RAM), read-only memory (ROM), erasable programmable read-only memory (EPROM), flash ram, optical fiber, compact disc read-only memory (CD-ROM), optical storage device, magnetic storage device, or any combination of the above. In the present application, the computer readable storage medium can be any physical medium including or storing programs. The program can be used by instruction implementation system, device or element or be used with a combination thereof. In the present application, the signal medium of the computer readable can include data signals transmitted in a baseband or transmitted as a part of a carrier, and it carries computer programs of the computer readable. Such transmitted data signals can be in various forms including but not limited to various electromagnetic various signals, optical signals, or any above suitable combinations. The signal medium of the computer readable can also be any computer readable medium other than the computer readable storage medium. The computer readable medium can transmit, spread or transport programs used by the instruction operation system, device or element or used with a combination thereof. The computer programs included in the computer readable medium can be transmitted in any suitable medium including but not limited to: wireless transmission, wired transmission, or combination of the above.

The flowcharts and block diagrams in the accompanying drawings illustrate system various frameworks, functions, and operations that can be implemented according to systems, methods, and computer program products of various embodiments of the present application. Each block of the flowchart or block diagram can indicate one module, program segments, or a part of codes. The above module, program segment, or part of codes includes one or more executable instructions configured to implement specified logic functions. It should also be noted that in some alternative embodiments, functions noted by the blocks can occur in a sequence different from that in the accompanying drawings. For example, two continuously expressed blocks can be implemented parallelly basically, and sometimes they can also be implemented in a reverse order, which depends on related functions. It should also be noted that each block in a block diagram or flowchart, and a combination of blocks in the block diagram or flowchart can be performed by an exclusive system for implementing specified functions or operations based on hardwares, or can be performed by a combination of exclusive hardwares and computer instructions.

Related units described in the embodiment of the present application can be implemented by a way of softwares, and can also be implemented by a way of hardwares. The described units can also be disposed in the processor. Names of these units under some circumstances do not constitute limits to the unit itself.

According to an aspect of the present application, a computer program product or computer program, the computer program product or computer program is provided and includes computer instructions. The computer instructions are stored in the computer readable storage medium. the processor of the computer apparatus reads the computer instructions from the computer readable storage medium. The processor implements the computer instructions such that the computer apparatus implements methods provided by the above various optional implementation ways.

In another aspect, the present application also provides a computer readable medium, the computer readable medium can be included in electronic apparatus described by the above embodiment, and can exist individually without being installed in the electronic apparatus. The above computer readable medium carries one or more program. When the above one or more programs are implemented by one of the electronic apparatuses, the electronic apparatus implements the method in the above embodiment.

It should be noted that although the above detailed descriptions mention several modules or units of the apparatus configured to implement operations, however such classification is not mandatory. Actually, according to the embodiments of the present application, features and functions of the above mentioned two or more modules or units can be reified in one module or unit. On the contrary, features and functions of the above described one module or unit can be further divided and reified by a plurality of modules or units.

By descriptions of the above embodiments, a person of ordinary skill in the art easily understand that exemplary embodiments described here can be achieved by softwares, and can also be achieved by a way of combining the softwares with necessary hardwares. Therefore, technical solution according to the present application embodiment can be embodied in form of a software product, the software product can be stored in a non-volatile storage medium (can be a CD-ROM, USB drive, mobile hard disk) or in a network, and includes several instructions such that a computing apparatus (can be a personal computer, server, touch terminal, or network apparatus) implements the method according to the present application embodiment.

A person of ordinary skill in the art, after considering the specification and practice of the disclosed embodiments here, would easily think other embodying solutions of the present application. The present application is intended to cover variants, uses or adaptive changes of the present application. Such variants, uses or adaptive changes obey general principles of the present application and include commonly known skills or common technical solution in the art not disclosed by the present application.

It should be understood that the present application is not limited to the above precise structures already described as above and illustrated in the accompanying drawings, and can have various modifications and changes without departing from its range. The range of the present application is only limited by the accompanying claims.

What is claimed is:

1. A screen touch point positioning method, wherein the method comprises:

sequentially scanning a plurality of point positions on a screen row by row and determining end point coordinates of touch line segments;

determining line segment coordinates of the touch line segments according to the end point coordinates of the touch line segments;

aggregating each of the touch line segments to obtain an aggregation touch region; and determining a coordinate of a screen touch point according to the line segment coordinate of each of the touch line segments in the aggregation touch region;

wherein the step of aggregating each of the touch line segments to obtain an aggregation touch region, comprises:

comparing the end point coordinates of the touch line segments of adjacent two rows;

determining that the two touch line segments are located in the same touch when the column coordinate of the end point of one of the touch line segments is located between the column coordinates of the two end points of another of the touch line segments; and aggregating the touch line segments in the same touch region to obtain the aggregation touch region.

2. The screen touch point positioning method according to claim 1, wherein the step of sequentially scanning the point positions on the screen row by row and determining the end point coordinates of the touch line segments, specifically comprises:

sequentially scanning each of the point positions of the screen row by row to obtain a touch feature value of each of the point positions; and determining the point positions as an end point of the touch line segment and recording the end point coordinate of the end point when the touch feature value of the point position is greater than a predetermined touch feature threshold and the touch feature value of another point position adjacent to the point position in the same column is less than the touch feature threshold.

3. The screen touch point positioning method according to claim 1, wherein the step of determining the line segment coordinates of the touch line segments, specifically comprises:

determining the column coordinates of the two end points of the touch line segment and a row coordinate of the row; and determining the line segment coordinates of the touch line segments based on the column coordinates of the two end points of the touch line segment and the row coordinate of the row.

4. The screen touch point positioning method according to claim 3, wherein the step of determining the coordinate of the screen touch point according to the line segment coordinate of each of the touch line segments in the aggregation touch region, specifically comprises:

determining the column coordinate of the screen touch point according to the column coordinate of each of the touch line segments end point in the aggregation region; and determining the row coordinate of the screen touch point according to the row coordinate of each of the touch line segments in the aggregation region.

5. The screen touch point positioning method according to claim 1, wherein the step of determining the line segment coordinates of the touch line segments, specifically comprises:

determining the column coordinates of the two end points of the touch line segment;

determining a column coordinate of a midpoint of the touch line segment based on the column coordinates of the two end points of the touch line segment; and determining the line segment coordinate of the touch line segment based on the column coordinate and a row coordinate of the midpoint of the touch line segment.

6. The screen touch point positioning method according to claim 5, wherein the step of determining the coordinate of the screen touch point according to the line segment coordinate of each of the touch line segments in the aggregation touch region, specifically comprises:

determining the column coordinate of the screen touch point according to the column coordinate of the midpoint of each of the touch line segments in the aggregation region; and determining the row coordinate of the screen touch point according to the row coordinate of the midpoint of each of the touch line segments in the aggregation region.

7. A screen touch point positioning device, comprising:
a scan module configured to sequentially scan a plurality of point positions on a screen row by row and determine end point coordinates of touch line segments;
a determination module configured to determine line segment coordinates of the touch line segments according to the end point coordinates of the touch line segments;
an aggregation module configured to aggregate each of the touch line segments to obtain an aggregation touch region; and
a positioning module configured to determine a coordinate of a screen touch point according to the line segment coordinate of each of the touch line segments in the aggregation touch region;
wherein the aggregation module comprises: a comparison sub-module configured to compare the end point coordinates of the touch line segments of adjacent two rows; a determination sub-module configured determine that the two touch line segments are located in the same touch when the column coordinate of the end point of one of the touch line segments is located between the column coordinates of the two end points of another of the touch line segments; and an aggregation sub-module configured to aggregate the touch line segments in the same touch region to obtain the aggregation touch region.

8. The screen touch point positioning device according to claim 7, wherein the scan module specifically comprises: collection sub-module configured to sequentially scan each of the point positions of the screen row by row to obtain a touch feature value of each of the point positions; record sub-module and configured to determine the point positions as an end point of the touch line segment and record the end point coordinate of the end point when the touch feature value of the point position is greater than a predetermined touch feature threshold and the touch feature value of another point position adjacent to the point position in the same column is less than the touch feature threshold.

9. The screen touch point positioning device according to claim 7, wherein the determination module specifically comprises: first coordinate determination sub-module configured to determine the column coordinates of the two end points of the touch line segment and a row coordinate of the row; first line segment coordinate sub-module configured to determine the line segment coordinates of the touch line segments based on the column coordinates of the two end points of the touch line segment and the row coordinate of the row.

10. The screen touch point positioning device according to claim 9, wherein the positioning module specifically comprises: a first column coordinate sub-module configured to determine the column coordinate of the screen touch point according to the column coordinate of each of the touch line segments end point in the aggregation region; and a first row coordinate sub-module configured to determine the row coordinate of the screen touch point according to the row coordinate of each of the touch line segments in the aggregation region.

11. The screen touch point positioning device according to claim 7, wherein the determination module specifically comprises: a second coordinate determination sub-module configured to determine the column coordinates of the two end points of the touch line segment; a third coordinate determination sub-module configured to determine a column coordinate of a midpoint of the touch line segment based on the column coordinates of the two end points of the touch line segment; and a second line segment coordinates sub-module configured to determine the line segment coordinate of the touch line segment based on the column coordinate and a row coordinate of the midpoint of the touch line segment.

12. The screen touch point positioning device according to claim 11, wherein the positioning module specifically comprises: a second column coordinate sub-module configured to determine the column coordinate of the screen touch point according to the column coordinate of the midpoint of each of the touch line segments in the aggregation region; and a second row coordinate sub-module configured to determine the row coordinate of the screen touch point according to the row coordinate of the midpoint of each of the touch line segments in the aggregation region.

13. An electronic apparatus, comprising:
at least one processor; and
a storage device configured to store at least one program, wherein when the at least one program is implemented by the at least one processor, the at least one processor implements step as follows:
sequentially scanning a plurality of point positions on a screen row by row and determining end point coordinates of touch line segments;
determining line segment coordinates of the touch line segments according to the end point coordinates of the touch line segments;
aggregating each of the touch line segments to obtain an aggregation touch region; and
determining a coordinate of a screen touch point according to the line segment coordinate of each of the touch line segments in the aggregation touch region;
wherein the step of aggregating each of the touch line segments to obtain an aggregation touch region, comprises:
comparing the end point coordinates of the touch line segments of adjacent two rows;
determining that the two touch line segments are located in the same touch when the column coordinate of the end point of one of the touch line segments is located between the column coordinates of the two end points of another of the touch line segments; and
aggregating the touch line segments in the same touch region to obtain the aggregation touch region.

14. The computer apparatus according to claim 13, wherein the step of sequentially scanning the point positions on the screen row by row and determining the end point coordinates of the touch line segments step, the processor implements steps as follows:
sequentially scanning each of the point positions of the screen row by row to obtain a touch feature value of each of the point positions; and determining the point positions as an end point of the touch line segment and recording the end point coordinate of the end point when the touch feature value of the point position is greater than a predetermined touch feature threshold and the touch feature value of another point position adjacent to the point position in the same column is less than the touch feature threshold.

15. The computer apparatus according to claim 13, wherein the step of determining the line segment coordinates of the touch line segments, the processor implements steps as follows:
    determining the column coordinates of the two end points of the touch line segment and a row coordinate of the row; and
    determining the line segment coordinates of the touch line segments based on the column coordinates of the two end points of the touch line segment and the row coordinate of the row.

16. The computer apparatus according to claim 15, wherein the step of determining a coordinate of a screen touch point according to the line segment coordinate of each of the touch line segments in the aggregation touch region step, the processor implements steps as follows:
    determining the column coordinate of the screen touch point according to the column coordinate of each of the touch line segments end point in the aggregation region; and
    determining the row coordinate of the screen touch point according to the row coordinate of each of the touch line segments in the aggregation region.

17. The computer apparatus according to claim 13, wherein the step of determining the line segment coordinates of the touch line segments, the processor implements steps as follows:
    determining the column coordinates of the two end points of the touch line segment; and
    determining a column coordinate of a midpoint of the touch line segment based on the column coordinates of the two end points of the touch line segment; and
    determining the line segment coordinate of the touch line segment based on the column coordinate and a row coordinate of the midpoint of the touch line segment.

18. The computer apparatus according to claim 17, wherein the step of determining a coordinate of a screen touch point according to the line segment coordinate of each of the touch line segments in the aggregation touch region step, the processor implements steps as follows:
    determining the column coordinate of the screen touch point according to the column coordinate of the midpoint of each of the touch line segments in the aggregation region; and
    determining the row coordinate of the screen touch point according to the row coordinate of the midpoint of each of the touch line segments in the aggregation region.

\* \* \* \* \*